J. H. CALISCH.
GAME APPARATUS.
APPLICATION FILED JAN. 18, 1911.

1,064,193.

Patented June 10, 1913.

WITNESSES:

INVENTOR

UNITED STATES PATENT OFFICE.

JAMES HOWARD CALISCH, OF YONKERS, NEW YORK, ASSIGNOR TO FROGS' NOVELTY COMPANY, OF NEW YORK, N. Y., A CORPORATION OF NEW YORK.

GAME APPARATUS.

1,064,193.   Specification of Letters Patent.   Patented June 10, 1913.

Application filed January 13, 1911. Serial No. 603,308.

*To all whom it may concern:*

Be it known that I, JAMES HOWARD CALISCH, a citizen of the United States, residing at 92 Woodworth avenue, in the city of Yonkers, county of Westchester, State of New York, have invented a new and useful Improvement in Game Apparatus, of which the following is a specification.

My invention relates to a game-apparatus, in which use is made of the oblong cylindrical bodies, heavily weighted at one approximately hemispherical end, which have a tendency, when placed upon a horizontal surface, of always assuming a vertical position, weighted end down, and which are commonly known as tumblers, or, when shaped like human beings or animals, as roly-polies.

The object of my invention is to combine the use of the said tumblers or roly-polies with the use of a game-board, in such a manner that their capacity for entertainment may thereby be greatly increased, and a game may thus be produced, fit to furnish wholesome amusement and healthful diversion to adults as well as to children.

Of the game-apparatus devised for this purpose, and by which a game is produced to be known by the name of leap-frog, the following is a full, clear and exact description, in which mention is made of various details, explained in the accompanying drawing which forms part hereof.

Figure 1 represents a plan-view of the game-board and its connections; Fig. 2 represents a sectional view along the line $x$ $x$ in Fig. 1; Fig. 3 represents the details of an inclined support, marked by the letter E in Figs. 1 and 2; Fig. 4 represents the sectional view of an ordinary tumbler; Fig. 5 represents a frog-shaped roly-poly; Fig. 6 represents a projecting device, marked in Figs. 1 and 2 by the letter G.

The game-apparatus consists of an oblong rectangular game-board A B C D, Fig. 1, to which are attached four sides so as to form a box, this box having in the center of one of its narrow sides an extension to the width of about one third the width of the box, the length of this extension being approximately one half of its width. From the outer corners of this extension, box walls extend to the outer corners of the rectangular box, the bottom of the box being similarly extended, so that thus are formed two triangular spaces in which the tumblers or roly-polies may be placed when not in use. Within the said extension is erected an inclined support E, Figs. 1 and 2, the higher end of which points toward the opposite narrow end of the box. This opposite end is extended upward to a little more than two and one half times the height of the other box sides, as indicated by letter F, Fig. 2.

Upon the inclined support E is mounted a projecting device G, Figs. 1 and 2. The details of this projecting device are shown in Fig. 6 to consist of a tube H.; a plunger J. K., ending at one end in a partly flattened ball J., at the other in a handle K.; and a coil-spring S., by means of which the device is operated. The tube H. is closed at each of its ends by a cap or end-piece L., L'., each provided with a horizontal slit, M., M'. At the posterior end of the box extension the plunger is passed through the box wall, through a corresponding slit N., Fig. 6, thus allowing the plunger to sway from side to side. Upon the plunger is transversely mounted a circular disk W., small enough to allow the horizontal sway of the plunger, and serving the purpose of fastening thereto the forward end of the coil-spring.

In order that the eye may be diverted from the true center, and that thus additional skill may be required for the correct operation of the projecting device, the inclined support E., Fig. 2, as shown in detail in Fig. 3, is rounded at its forward end to a curved line P., consisting of two curves of different radii, joined to form one continuous curve, the true center of the combined curve lying to one side of the imaginary center-line Y. Y., Fig. 3, drawn midway between the two parallel sides of the said support. In addition, the two points at which the curved line P, joins the two parallel sides of the support are at unequal distances from the support's extreme forward end, as demonstrated by the line Z. Z., drawn from side to side perpendicularly to the center line Y. Y., and showing that the point of juncture to the left is farther away from the said extreme forward end than is the point of juncture to the right. In order further to divert the eye from the center, said support is near its forward end, furthermore provided with an eccentric rosette Q., the center of the said rosette lying to one side of the said center line Y. Y.

The game-board toward which the tumblers or roly-polies are projected, is divided into two distinct parts; one part, Fig. 1, A b d e f g D, representing land, and another part, Fig. 1, R, representing water. The two parts are partly separated from one another by a low wall-like hazard, T—T', Figs. 1 and 2, in the shape of a half circle with two rectilinear outward extensions of the diameter. The purpose of this hazard is to create an obstruction that will partly prevent the passing of the projectiles from the part representing water to the part representing land. From that part of the game-board representing water, two rectangular spaces, a, a', have been separated for the purpose of inserting therein the rules of the game.

That part of the game-board which represents land, is provided with cavities representing various denominations, some marked so as to increase the score, some so as to decrease it; and between these cavities spaces are left, of which some are marked with the word leapfrog, all of which as shown in detail in Fig. 1, while other spaces are marked as private grounds, (indicated in Fig. 1 by the letters P. G.); but the projecting device is so adjusted that, with the necessary skill applied to its use, the projectile may be made to fall into the cavity representing the highest denomination.

That part of the game-board representing water, is not provided with cavities; but at a suitable distance from the projecting device there is erected on this division a pedestal, V., Figs. 1 and 2; and whenever one of the tumblers or roly-polies falls on a space marked leap-frog, it is placed on this pedestal, waiting to be released under certain rules for which the game provides; while the inclined support E., Fig. 2, the projecting device G., Fig. 2, the coil-spring S., Fig. 6, and the center of gravity of the projectile, Figs. 4 and 5, are all so adjusted that another of the projectiles may be made to fly over the projectile standing on the pedestal without the former touching the latter.

Figure 1:
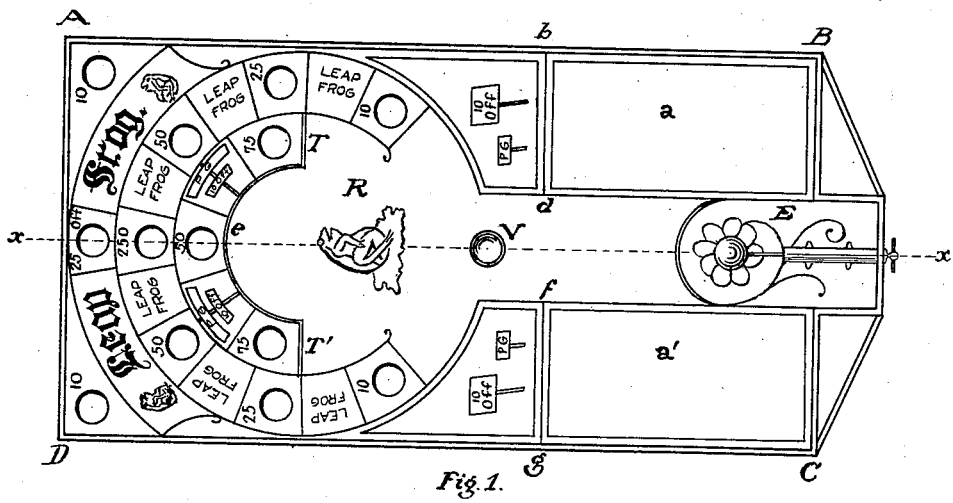
Figure 2:
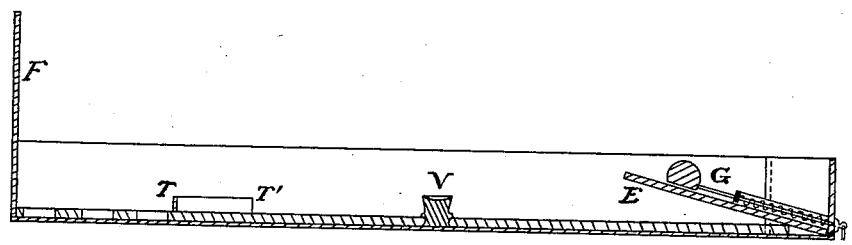
Figure 3:
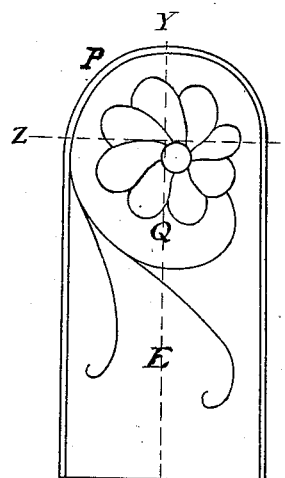
Figures 4, 5:
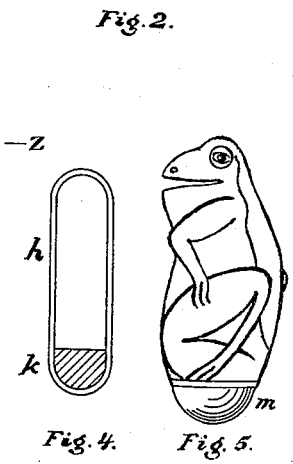
Fig. 4 shows a section of an ordinary tumbler, in which $h$. indicates a hollow shell of gelatin, celluloid, or another similar light material, while $k$. indicates the manner in which the tumbler is weighted at one end by an approximate hemisphere of lead.
Fig. 5 shows the design of a roly-poly in the shape of a frog, which shape will preferably be used in connection with this game-apparatus, and $m$. indicates the approximately hemispherical end weighted by an approximate hemisphere of lead.
Figure 6:
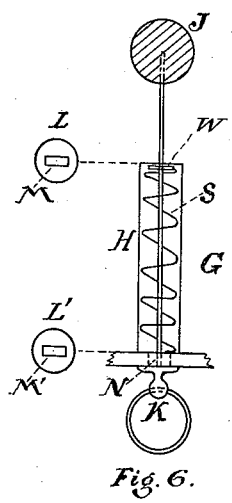

Having now described my invention in detail, the claims which I desire to secure by Letters Patent are:

1. A game-apparatus, comprising a projecting device; an oblong projectile having an approximately hemispherical end, weighted in such a manner that when placed on a horizontal surface the projectile will invariably assume a vertical position, weighted end down; and a game-board provided with cavities into which the projectile, when properly propelled by the said projecting device, is adapted to fall; and further provided with an immovable pedestal and a wall-like hazard, substantially as described.

2. A game-apparatus, comprising a projecting device; a projectile weighted at one end, adapted to be propelled by the said projecting device; and a game-board provided with cavities, an immovable pedestal, and a wall-like hazard, substantially as described.

3. A game-apparatus, comprising a game-board provided with cavities, a projectile weighted at one end, a projecting device, and a non-adjustable inclined support, upon which the said projecting device is mounted, for the purpose of raising the said projectile to a suitable height, when propelled by the said projecting device.

4. A game-apparatus, comprising a projecting device, consisting of a plunger, a coil-spring and an immovable tube; the said tube being closed at each end by a cap or end-piece, each of which is provided with an elongated horizontal slit, for the purpose of allowing a change in the position of the plunger in a horizontal direction; while upon the plunger is mounted transversely a circular disk, small enough to allow the said free horizontal motion of the plunger, and serving the purpose of fastening thereto the forward end of the said coil-spring.

5. A game-apparatus, comprising a projecting device permanently mounted on an inclined support, the forward end whereof is rounded to a curved line out of center with the said support, for the purpose of diverting the eye from the exact center, substantially as described.

6. A game-apparatus, comprising a projecting device permanently mounted on an inclined support, the surface of the said support being provided with an eccentric rosette, for the purpose of diverting the eye from the exact center, substantially as described.

In testimony whereof, I have hereunto subscribed my name in the presence of two subscribing witnesses, this 17th day of January 1911.

JAMES HOWARD CALISCH.

Witnesses:
HAROLD CHARLES BARTEL,
RALPH CAVIS BOSWELL.

Copies of this patent may be obtained for five cents each, by addressing the "Commissioner of Patents, Washington, D. C."